March 8, 1966 G. A. LEVINE 3,239,142
PNEUMATIC SENSING DEVICE WITH DIGITAL READOUT
Filed Feb. 28, 1963
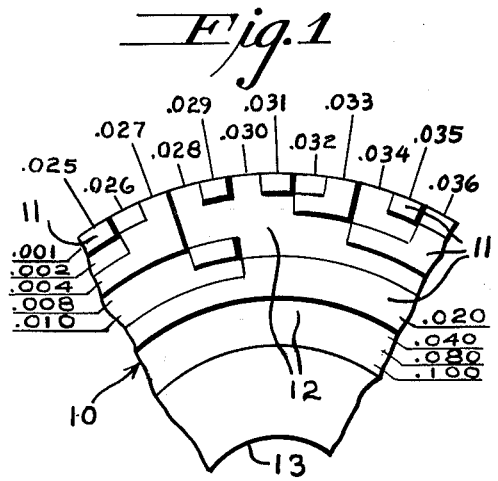
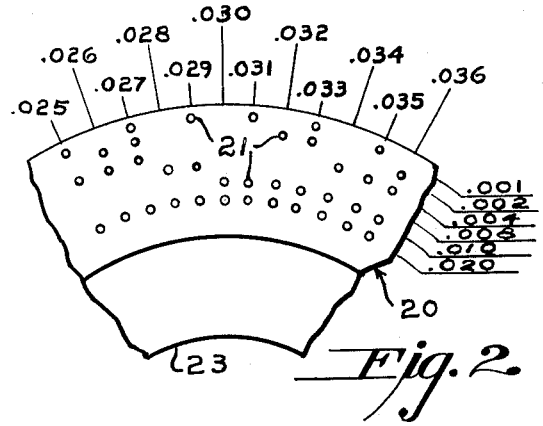
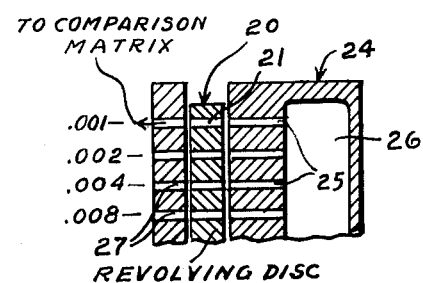
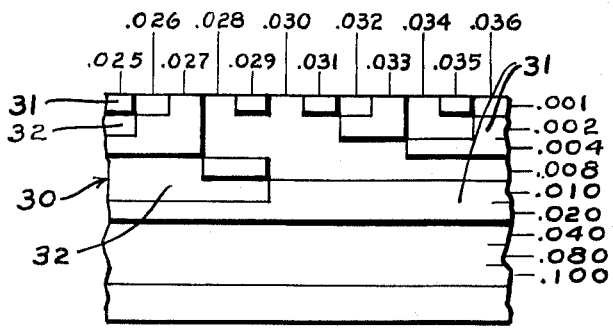
INVENTOR.
GERALD A. LEVINE
BY
Clarence R. Patty Jr.
ATTORNEY

United States Patent Office 3,239,142
Patented Mar. 8, 1966

3,239,142
PNEUMATIC SENSING DEVICE WITH DIGITAL READOUT
Gerald A. Levine, Corning, N.Y., assignor to Corning Glass Works, Corning, N.Y., a corporation of New York
Filed Feb. 28, 1963, Ser. No. 261,725
5 Claims. (Cl. 235—201)

This invention relates to pneumatic sensing devices for use with fluid amplifiers circuits, and more particularly to apparatus for pneumatically sensing the angular position of a rotating shaft or rectilinear positionment of a movable carriage in numerically-coded form.

In numerically-controlled machine tools, the location of the table or carriage retaining a workpiece, or the location of the operating tool must be controlled with respect to an arbitrary "zero" location. It is therefore necessary to provide means for sensing the actual position of the tool or table in order to determine the magnitude and direction of error between the actual positionment and the desired positionment, so that the correct mechanism may be actuated to drive the tool or table to the desired positionment.

I have found that in fluid controlled machine tool systems, such as those utilizing fluid amplifiers, it is convenient to sense the actual positionment of the tool or support table by providing a suitably calibrated record carrier or binary encoded device such as a longitudinal bar secured to a movable carriage supporting the tool or table, or a disc on the shaft of a lead screw utilized to position such tool or table. The carrier or encoded device to be sensed is provided with means for representing various bit levels of a coded numeral, and in the case of the disc, such means may be arranged in concentric ring or radially-spaced annular form. A plurality of conduits communicating with a suitable source of fluid under pressure, such as one or more plenum chambers, have outlets positioned adjacent the sensing device, which outlets are radially-aligned when utilized with the disc. Responsive to the position of the sensed device, the conduits pressurize certain fluid passages representing portions of the coded numeral, such as the various bit levels of a binary code. The fluid passages, being pressurized in response to the position of the encoded member or record carrier, which in the case of the disc is mounted on and rotatable with the lead screw shaft, and in the case of the bar is mounted on a machine carriage, provide a digital readout for locating the actual positionment of the tool or table with respect to an arbitrary "zero."

It thus has been an object of the invention to provide an improved pneumatic sensing system having digital readout means.

A further object of the invention has been to provide improved apparatus for determining the angular positionment of a rotating shaft or the rectilinear positionment of a movable carriage by pneumatic sensing means and representing such position in binary form.

An additional object of the invention has been to provide a sensing device for determining the position of a tool or support table with respect to an arbitrary "zero" location in fluid-operated numerically-controlled machine tools.

These and other objects of the invention will be more apparent to those skilled in the art from the following disclosure and accompanying drawings in which:

FIGURE 1 is a fragmental plan view of an encoded sensing disc-type record carrier embodying the invention;
FIGURE 1A is a somewhat schematic fragmental view in section illustrating the operation of the disc shown in FIGURE 1;
FIGURE 2 is a fragmental plan view of another embodiment of an encoded disc-type record carrier encompassed within the scope of the invention;
FIGURE 2A is a somewhat schematic fragmental view in section illustrating the operation of the disc shown in FIGURE 2; and,
FIGURE 3 is a fragmental plan view of a calibrated or encoded bar embodying the invention.

Although the sensing apparatus of the present invention is particularly applicable to pneumatically operated numerically-controlled machine tools, it is suitable for use with virtually any fluid-operated system; however, for the purposes of illustration, the invention will be described with respect to the positionment of a work table forming a part of a numerically controlled machine tool. Generally, the encoded disc is provided with a plurality of sectors, each having a unique configuration representing various binary bits, which may be pneumatically sensed to indicate the angular position of the disc. Since the disc may be directly attached to the shaft of the table lead screw, increments of table movement are readily detected by the binary coded bit configurations on the disc.

If, for example, the lead screw moves the table .100 inch per revolution and the disc is divided into 100 sectors, each having a unique configuration of binary coded bit levels, then any position of the table within a span of .100 inch may be sensed with a resolution of .001 inch.

Referring now to FIGURES 1 and 1A, a portion of an encoded disc or record carrier 10 embodying my invention is shown having a plurality of raised portions or lands 11 representing various binary bit levels, and a plurality of grooved or recessed portions 12. The disc 10 is provided with a central open portion 13 to facilitate the mounting of the disc on a suitable collar or shaft of a lead screw. Although any desired bit level range may be utilized, the sensing disc 10 is shown as provided with .001 .002, .004, .008, .010, .020, .040, .080, and .100 bit levels, wherein a span of between 0 and .200 may be conveniently sensed. The segment of the disc 10 shown in the drawing illustrates the configurations of the lands 11 necessary to represent binary bit levels of between .025 and .036.

In operation, the disc 10 is attached to the shaft of a lead screw in such a manner so that it is free to rotate with the shaft, with the raised portions or lands 11 on its surface passing in close proximity to a sensing block 14 (see FIGURE 1A). A plurality of air lines or conduits 15, which may be provided with appropriate restrictions, communicate at one end with a suitable source of fluid under pressure such as a plenum chamber 16. The opposite ends of conduits 15 terminate in outlet ports, spaced radially from the shaft so that each is related to a different radially-spaced annular disc portion utilized to represent a different bit level of the binary code. A plurality of fluid readout passages 17, each communicating at one end with one of the conduits 15, intermediate their ends, provide a digital readout for each of the bit levels.

A stream of fluid such as air from plenum chamber 16 passes through a restriction in each conduit 15 and outwardly through two orifices, one at the end of the conduit 15 facing the sensing disc 10, and the other at the end of fluid passage 17 leading to the readout. The output pressures at these two orifices are dependent upon their relative cross-sectional areas. When a land 11, representing a binary bit, passes over an outlet orifice of one of the conduits 15, at a distance of not more than approximately .002 inch, there is a pressure rise at the other orifice at the end of the associated readout passage 17, thereby actuating the bit level representing by such passage. Thus a binary bit representing one part of a decimal digit indicating table position is pressurized at the readout. The readout may be fed to a comparison matrix so as to compare the binary signal representing the actual position of the table with a signal representing a desired position thereof, or it may be converted into a visual indication of position.

In the illustration shown in FIGURE 1A, the .001 bit and the .004 bit would be pressurized, indicating a positionment of .005. Although not shown, the remaining bit levels .010–.100, shown in FIGURE 1, would also have readout passages 17 communicating with associated conduits 15, which would be pressurized upon the presentation of the lands 11 representing such bit levels.

Referring now to FIGURES 2 and 2A, an encoded disc or record carrier 20, representing a further embodiment of the invention, is shown having a plurality of radially aligned holes or passages 21 extending therethrough, in such a pattern so as to represent various binary-coded-decimal digits. The center of the disc 20 is provided with an open or recessed portion 23 for facilitating attachment of the disc to a shaft. Like the disc shown in FIGURE 1, sensing disc 20 may be provided with bit levels from .001 to .100 so as to conveniently sense a span from 0 to .200. Since the segment of a disc shown in FIGURE 2 illustrates the same binary bit sectors shown in FIGURE 1, namely, .025–.036, only holes representing the .001–.020 bit level are shown.

The operation of disc 20 is similar to that of disc 10 in that the disc is secured to the shaft of a lead screw in such a manner so that the surface thereof is free to rotate in close proximity to a sensing block 24. The block 24 has a plurality of conduits 25 which may have suitable restrictions therewithin, and which communicate at one end with a suitable source of fluid under pressure such as a plenum chamber 26. The outlet ends of the conduits 25 are spaced radially from the shaft so that each is related to the holes 21 repersenting different bit levels of the binary code. An air stream from plenum chamber 26 is directed through each of the conduits 25 onto the face of the disc 20, and whenever a hole 21 exists adjacent conduit 25, the stream passes through the disc and pressurizes a fluid readout passage 27 representing the bit level presented by the hole 21 in disc 20. As in FIGURE 1A, the schematic representation shown in FIGURE 2A illustrates a situation wherein the .001 and .004 bit levels are pressurized, indicating that the table positionment is at .005. Here again, however, the remaining bit levels .010–.100 would also have corresponding conduits 25 and associated fluid readout passages 27 for indicating the presence of such bit levels.

FIGURE 3 illustrates a longitudinal record carrier bar 30 embodying the invention. The bar 30 is similar to the disc 10, however, the lands 31 representing the various bit levels are arranged in retilinear orientation rather than arcuate orientation as in the case of disc 10. If desired, holes or passages such as shown in FIGURE 2 may be utilized in place of the lands 31 to represent the various bit levels. Recessed or grooved portions 32 are interposed between the bit levels in a manner similar to the recessed portions 12 of disc 10. The bar 30 is utilized in the same manner as disc 10 except that the bar is secured to a rectilinearly movable carriage on the machine tool rather than a rotating shaft. A sensing block similar to block 14 or 24 is positioned adjacent the sensing bar 30 to read the various bit levels presented to it for sensing in the same manner as discs 10 and 20.

Although I have disclosed the now preferred embodiments of my invention it will be apparent to those skilled in the art that various changes and modifications may be made thereto without departing from the spirit and scope thereof as defined in the appended claims.

I claim:

1. Apparatus for continuously pneumatically sensing the position of a movable machine part relative to a predetermined reference and representing such position in binary coded form by the presence or absence of pressure in fluid readout passages which comprises, an encoded member mounted for movement with a movable machine part, a plurality of lands and grooves formed on the face of said encoded member representing the presence and absence respectively of various bit levels of the binary code, said lands and grooves providing a plurality of adjacent sections each having a unique configuration of lands representing a different binary coded value for indicating a particular positionment of the machine part, a sensing block positioned in close adjacency to the lands of said encoded member to simultaneously supply fluid under pressure to each bit level within a section presented thereto for sensing in response to the position of the machine part, said sensing block comprising a pressure chamber having a plurality of conduits each communicating at one end with said pressure chamber and at an opposite outlet end terminating in close proximity with the encoded member at different bit levels within the section of the encoded member presented for sensing, and fluid readout passages branching out from said conduits intermediate their ends, one for each bit level and being selectively pressurized in response to fluid supplied by said sensing block when a land closes off a conduit at a bit level presented to the sensing block by said encoded member, thus providing a binary coded readout representing the position of the machine part.

2. Apparatus as defined in claim 1 wherein said lands are arranged in a plurality of discontinuous rings each representing a different bit level of the binary code, and said rings are concentric about the longitudinal axis of a machine shaft about which said encoded member is rotatable.

3. Apparatus for pneumatically sensing the angular position of a rotatable shaft and representing such position in binary coded form by the presence or absence of pressure in various readout passages which comprises, a rotatable disc mounted for rotation about the longitudinal axis of the shaft being sensed, a plurality of concentric discontinuous ring-like lands formed on said disc with the radial position thereof representing various bit levels of the binary code, said disc having a plurality of sectors each provided with a unique configuration of lands representing a different binary coded value for indicating a particular angular positionment of the disc about the longitudinal axis, sensing means positioned in close adjacency to the lands of said disc, said sensing means having a plurality of conduit means in communication with a source of fluid pressure for simultaneously supplying fluid under pressure to each radially-positioned bit level within a sector presented to such sensing means for sensing by the angular position of the disc, and readout means carried by said sensing means having a fluid passage for each bit level which is in communication with said conduit means and selectively pressurized in response to the fluid supplied thereby when a land representing such bit level is presented to the sensing means by said rotatable disc and closes off its associated conduit means, thus providing a binary coded readout representing the angular position of the rotatable shaft.

4. Apparatus as defined in claim 3 wherein said sensing means includes, a sensing block positioned in close adjacency to said lands, a plenum chamber within said block for supplying fluid under pressure, and said plurality of conduits each communicating at one end with said plenum chamber and at an opposite outlet end terminating in close proximity with a different radially-positioned bit level within a sector of said disc presented for sensing.

5. Apparatus as defined in claim 4 wherein said fluid passages each communicate with one of said conduits intermediate its ends such that when a land representing a certain bit level of the binary code is presented to close off the outlet end of one of said conduits, its corresponding fluid passage will be pressurized to indicate the presence of such bit level.

References Cited by the Examiner

UNITED STATES PATENTS

| | | | |
|---|---|---|---|
| 1,688,539 | 10/1928 | Fisher. | |
| 1,936,416 | 11/1933 | Turnbull | 235—58 |
| 2,027,033 | 1/1936 | Ford | 235—61.117 |
| 2,792,275 | 5/1957 | Drillick | 235—58 |
| 2,793,807 | 5/1957 | Yeager | 340—347 |
| 2,904,070 | 9/1959 | Lynott | 235—61 |
| 2,942,252 | 6/1960 | Woiff | 340—347 |
| 2,977,582 | 3/1961 | Wolman | 340—347 |
| 3,003,694 | 10/1961 | Oxley | 235—146 |
| 3,057,375 | 10/1962 | Etter | 235—61 |
| 3,082,781 | 4/1963 | Moosmann | 235—61 |
| 3,100,600 | 8/1963 | Williams. | |

FOREIGN PATENTS 1,044,116  11/1958  Germany.

OTHER REFERENCES

IBM Disclosure, vol. 5, No. 8, January 1963, page 30.

LEO SMILOW, *Primary Examiner.*